United States Patent [19]

Yamaguchi et al.

[11] Patent Number: 4,672,442

[45] Date of Patent: Jun. 9, 1987

[54] FRAME RATE CONVERSION SYSTEM IN TELEVISION SIGNAL

[75] Inventors: Hirohisa Yamaguchi; Masahiro Wada, both of Tokyo; Hideo Yamamoto, Kanagawa, all of Japan

[73] Assignee: Kokusai Denshin Denwa Co., Ltd., Tokyo, Japan

[21] Appl. No.: 755,023

[22] Filed: Jul. 15, 1985

[30] Foreign Application Priority Data

Jul. 17, 1984 [JP]   Japan ................................ 59-146999

[51] Int. Cl.⁴ .............................................. H04N 7/01
[52] U.S. Cl. ..................................... 358/140; 358/105
[58] Field of Search .......................... 358/140, 105, 11

[56] References Cited
U.S. PATENT DOCUMENTS 4,240,113  12/1980  Michael ............................... 358/105

FOREIGN PATENT DOCUMENTS 55-162684  12/1980  Japan .
55-162685  12/1980  Japan .
55-162683  12/1980  Japan .

OTHER PUBLICATIONS

Institute of Electronic and Communication Engineers of Japan, IE 83-93, "A Move-Quantity Detection by the Repeated Gradient Process Method", 1984, 2,2.
Institute of Electronics and Communication Engineers of Japan 84'2 volume J67-B, No. 2.

Primary Examiner—Howard W. Britton
Attorney, Agent, or Firm—Armstrong, Nikaido, Marmelstein & Kubovcik

[57]    ABSTRACT

A frame rate conversion, for instance between NTSC and PAL, or SECAM, has been improved by interpolation system in which an interpolation is performed from picture elements of two consecutive frames of an original picture signal whose positions are shifted from the position of a picture element to be interpolated by amounts related to the move length of a picture block between the two consecutive frames period, instead of using picture elements of two consecutive frames of the original signal that have the same position coordinates as those of the picture element to be interpolated. Picture quality of the converted signal is improved in particular when a picture moves.

2 Claims, 10 Drawing Figures

625 LINES/FRAME (ORIGINAL FRAME)   525 LINES/FRAME (INTERPOLATED FRAME)

FRAME RATE CONVERSION SYSTEM IN TELEVISION SIGNAL

BACKGROUND OF THE INVENTION

The invention is concerned with a picture frame rate conversion system for TV signals and the like. It is particularly suitable for moving picture frame rate conversions, e.g., the mutual conversions between two TV standard systems, and is effective in recovering a time-axis compressed moving picture signal.

A moving picture in general, including the TV picture, is not given by a continuous signal in time. This is because the basic principle of a moving picture is to display a certain fixed number (or frame rate) of still pictures one after another per second.

When it comes to TV systems, for example, Japan's TV system has a frame rate of 30 frames/second, while the TV system adopted in European countries including the U.K. and France has a frame rate of 25 frames/second. Therefore, it is indispensable to have an appropriate frame rate conversion technique for the exchange of TV broadcast programs between countries of different frame rate.

Let us explain the convertional technique used in converting frame rate. A color TV signal in general is composed of three components known as R, G, and B or Y, I, and Q respectively. In converting the frame rate of such a signal, the signal is first decomposed into its three components, and then each component gets a desired frame rate conversion by the same method. Therefore, the conventional frame rate conversion of one of the three components is explained below. This is equivalent to that of a monochrome TV signal.

FIG. 1 and FIG. 2 show the basic principle of frame rate conversion between a frame rate of 25 frames/second and that of 30 frames/second. That is, a conversion frame 25 frames/second ($(a)_{25}$, $(b)_{25}$, ---) into 30 frames/second ($(a)_{30}$, $(b)_{30}$, ---) is shown in FIG. 1 and the inverse conversion is shown in FIG. 2. In both cases, each of the solid lines and dotted lines drawn in the perpendicular direction to the time axis represent one frame of a moving picture signal that extends two-dimensionally.

As the ratio of frame rates in FIG. 1 and FIG. 2 is 25/30=5/6, if at a time point the position of a frame of 25 frames/sec. and that of a frame of 30 frames/sec. are synchronized, synchronization of the both frame groups takes place at every 5 frame intervals of one or 6 frame intervals of the other. For example, in FIG. 1, starting with the same position of $(a)_{25}$ and $(a)_{30}$, the position of $(f)_{25}$ coincides with that of $(g)_{30}$, and in FIG. 2, in the same condition the position of $(g)_{30}$ coincides with that of $(f)_{25}$. Generally, in a frame rate conversion, a process is repeated with a period determined by the ratio of frame rates (in the above examples, 5 frame intervals of one group or 6 frame intervals of the other group.), and it is sufficient to explain the process for one period.

In FIG. 1, the converted frames $(a)_{30}$, $(b)_{30}$, ---, $(g)_{30}$ are obtained as follows.

frame $(a)_{30}$ — frame $(a)_{25}$ itself,
frame $(b)_{30}$ — synthesized from frame $(a)_{25}$ and frame $(b)_{25}$.
frame $(c)_{30}$ — synthesized from frame $(b)_{25}$ and frame $(c)_{25}$.
frame $(d)_{30}$ — synthesized from frame $(c)_{25}$ and frame $(d)_{25}$.
frame $(e)_{30}$ — synthesized from frame $(d)_{25}$ and frame $(e)_{25}$.
frame $(f)_{30}$ — synthesized from frame $(e)_{25}$ and frame $(f)_{25}$.
frame $(g)_{30}$ — frame $(f)_{25}$ itself.

An interpolation process is carried out in synthesizing a converted frame. A device that performs the interpolation process is called an interpolation filter, and in the explanation to follow, the simplest interpolation filter to be realized in hardware, a linear interpolation filter, is considered as an example.

FIG. 3 shows a interpolation process that provides an interpolated frame I from given consecutive frames, i.e., frame A and frame B. That is, each picture element of interpolated frame I (i.e., a sampled value of the sampled part of a picture signal) $Y_{ij}$ (i: scanning line number, j: column number counted from leftmost) is produced from a picture element $X_{ij}^{(1)}$ of frame A and a picture element $X_{ij}^{(2)}$ of frame B, each of which has the same position coordinates as those of the picture element $y_{ij}$. The interpolation rule is given by the following expression.

$$y_{ij} = b\, X_{ij}^{(1)} + a\, X_{ij}^{(2)} \tag{1}$$

where a and b are proportional to the distance on the time axis between frame A and frame I and that between frame B and frame I respectively, and are normalized as follows:

$$a + b = 1.0\ (a, b \geq 0) \tag{2}$$

For example, in FIG. 1, when frame $(c)_{30}$ is synthesized from frame $(b)_{25}$ and frame $(c)_{25}$, a and b are given as follows.

$$a = \tfrac{2}{3},$$

$$b = \tfrac{1}{3}$$

In the example shown in FIG. 3, if the original picture signal is a quiescent picture signal, the signal value of frame A is the same as that of frame B ignoring possible noise superposed, and the signal value of interpolated frame I is equal to that of frame A or that of frame B. Therefore, no deterioration arises in picture resolution. If the original signal is a moving picture signal, however, two picture elements $X_{ij}^{(1)}$, $X_{ij}^{(2)}$ shown in FIG. 3, hardly have the same signal value, and an extra noise component, known as area error is included in the corresponding interpolated picture element. As a result, the conventional technique has the following drawbacks.

(i) The signal of interpolated frame I gets extremely blurred.

(ii) The movement of a converted moving picture is somewhat unnatural. (this is called jerkiness)

It is clear that these drawbacks more striking with the progress in the TV camera's picture resolution and the increase in velocity the picture's movement. (see "A frame rate conversion of moving picture signals — an analysis of the conversion characteristic with the time axis direction process." (in Japanese) Trans. of the Institute of Electronics and Communication Engineers of Japan, '84/2, Vol. J 67-B, No. 2.)

SUMMARY OF THE INVENTION

The invention aims at offering a frame rate conversion technique that eliminates the drawbacks of the conventional time axis direction interpolation process, and provides a converted moving picture signal with little deterioration in picture resolution even when an original signal is in quick motion.

The present moving picture frame rate conversion system converts a first picture signal with a first frame rate into a second picture signal with a second frame rate which differs from said first frame rate by generating an interpolation frame between two consecutive frames of the first picture signal, wherein said interpolation frame is generated by using a first picture block on a first frame and a second picture block on a second frame of the first picture signal, and said second picture block is moved in position relative the first picture block.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 4:
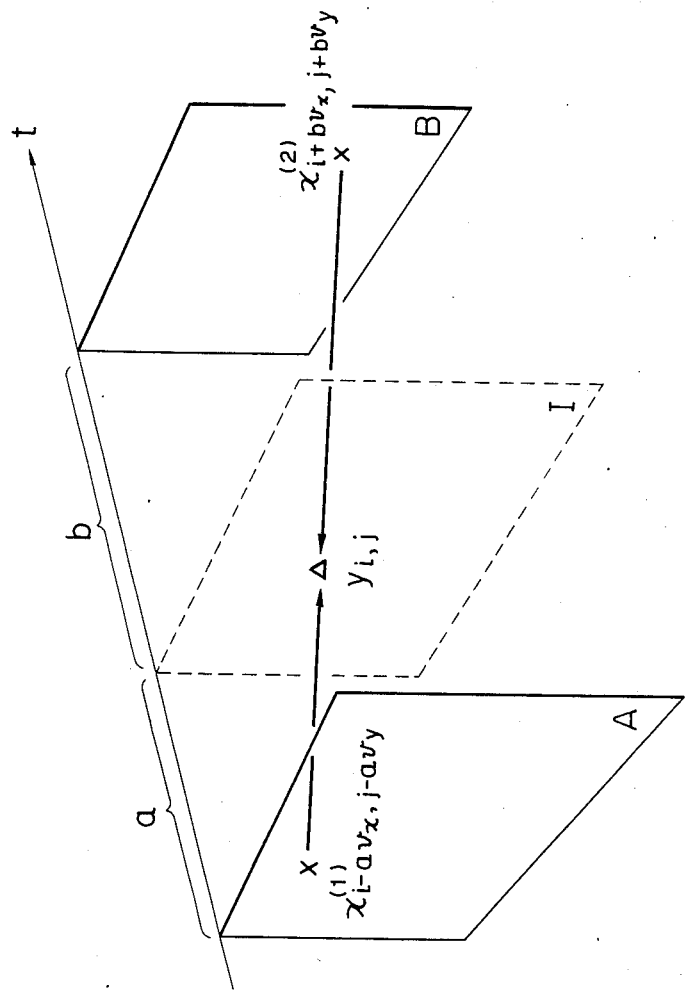
FIG. 4 shows an example of the time axis interpolation of the present invention.

FIG. 4 shows the principle of the invention. To begin with, for a picture element $y_{ij}$ of interpolated frame I, the move-quantity of this picture element or a block including this picture element is obtained, which is denoted by $(v_x, v_y)$ (picture element/frame).

Then, a picture element of frame A, $X_{(i-av_x, j-av_y)}$, (1) is chosen whose position is deviated from that of the picture element to be synthesized by an amount related to the move-quantity. In the same way, a picture element of frame B, $X_{(i+bv_x, j+bv_y)}$ (2) is chosen. The picture element to be synthesized, $y_{i,j}$, is given by the following interpolation process:

$$Y_{i,j} = b\, X_{i-av_x,\,(1)\,j-av_y} + a\, X_{i+bv_x,\,(2)\,j+bv_y} \quad (3)$$

where the parameters a and b are defined as relative distances between frame I and frame A, frame B, respectively, and are normalized by expression (2).

There is a problem in executing the interpolation process of the equation (3). For example, the calculated position of frame A, i.e., $(i-av_x, j-av_y)$, does not always coincide with the position of a picture element of frame A, because the picture elements of frame A are defined by discrete points regularly sampled along its scanning lines. Therefore, when a calculated position is not the position of a picture element of frame A, a linear interpolation from four picture elements of frame A surrounding the calculated position to give an approximated picture element value is found to be effective to avoid picture blur.

In this case, the values of picture element $X_{i-av_x,\,j-av_y}$ (1) and picture element $X_{i+bv_x,\,j+bv_y}$ (2) are given by the following two expressions (4) and (5) respectively:

$$X_{i-av_x,\,j-av_y}{}^{(1)} = \alpha_2[\beta_2 X_{i',j'} + \beta_1 X_{i',j'+1}] + \alpha_1[\beta_2 X_{i'+1,j'} + \beta_1 X_{i'+1,j'+1}] \quad (4)$$

where, $i' = [i - av_x]$ ( [ ] is the symbol of Gauss)
$j' = [j - av_y]$ ( [ ] is the symbol of Gauss)
$\alpha_1 = |1 - av_x - [-av_x]| < 1$
$\alpha_2 = 1 - \alpha_1$
$\beta_1 = |-av_y - [-av_y]| < 1$
$\beta_2 = 1 - \beta_1$ $$X_{i+bv_x,\,j+bv_y}{}^{(2)} = \gamma_2[\delta_2 X_{i'',j''} + \delta_1 X_{i'',j''+1}] + \gamma_1[\delta_2 X_{i''+1,j''} + \delta_1 X_{i''+1,j''+1}] \quad (5)$$

where $i'' = [i + bv_x]$ ([ ] is the symbol of Gauss)
$j'' = [j + bv_y]$ ([ ] is the symbol of Gauss)
$\gamma_1 = |bv_x - [bv_x]| < 1$
$\gamma_2 = 1 - \gamma_1$
$\delta_1 = |bv_y - [bv_y]| < 1$
$\delta_2 = 1 - \delta_1$ The move-quantity $(v_x, v_y)$ can be obtained by one of the known methods. For example, the values of an evaluation function are obtained from an input signal and a signal of the preceding frame being in the position shifted by an arbitrary shift vector from a fixed point on a TV screen as the position reference. The detection of a move-quantity vector is done in a procedure divided into N steps. At the Lth step, (L=1, 2, —, N−1), the (L+1)th shift vector group is determined on the basis of the evaluation function's values obtained from the Lth shift vector group. Finally, at the Nth step, the move-quantity vector is provided by a vector determined on the basis of the evaluation function's values obtained with the Nth shift vector group see: (Japanese patent laid open publication Nos. 55-162684, 55-162685, 55-162683).

Moreover, a method using a so-called gradient process detects any move-quantity with high precision. According to this method, in detecting the move-quantity of a picture element or a block of picture elements of a frame, first, the move-quantity (this is a vector quantity) of a picture element or a block of picture elements of the preceding frame that has the same position coordinates as those of the said picture element or the said block of picture elements is obtained by applying the gradient process. Then, a picture element or a block of picture elements being in a position deviated inversely by the obtained move-quantity is cut out, and again its move-quantity is obtained by applying the gradient process. The process is repeated until a detected move-quantity becomes less than a predetermined quantity. At this stage, the move-quantity of the initial picture element or the initial block of picture elements is given by the total sum of the detected move-quantities. (see: Material of the Institute of Electronics and Communication Engineers of Japan, IE 83-93, "A move-quantity detection by the repeated gradient process method.", (in Japanese) 1984, 2,2.)

Further, two of the present applicants have filed a patent application concerning a movement estimation system for video signals in the U.S. (U.S. Ser. No. 696,371), and the present assignee has filed same in Great Britain (Ser. No. 8502144).

Figure 6:
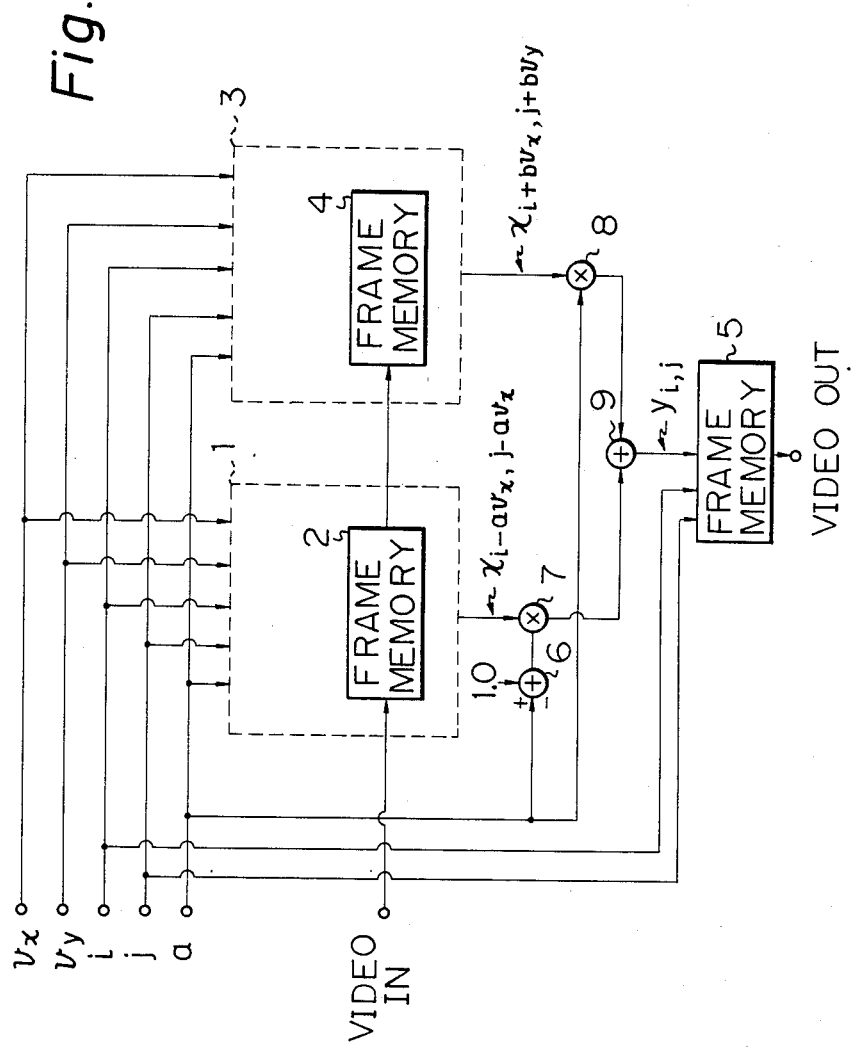
FIG. 6 shows a block diagram of the frame rate conversion circuit according to the present invention.
Figure 8:
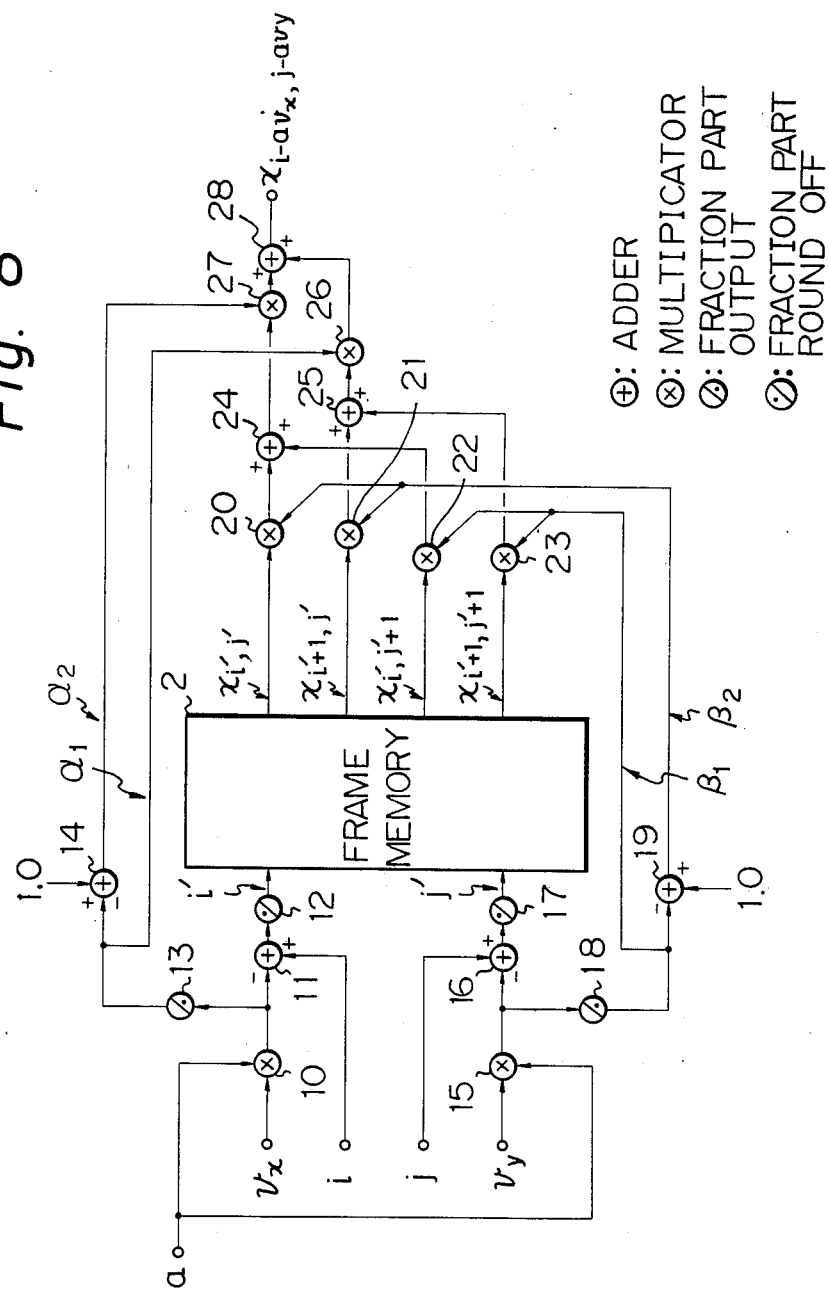
FIG. 8 is a block diagram of a calculation circuit 1 in FIG. 6.
Figure 9:
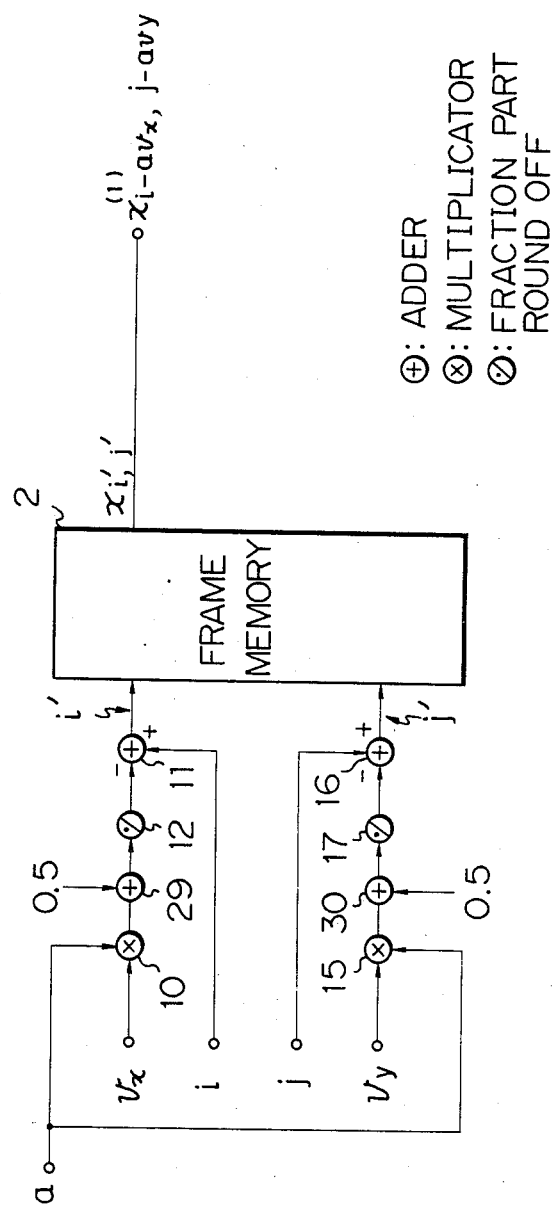
FIG. 9 is a block diagram for the interpolation circuit of a frame rate converted picture signal.

FIG. 6 shows the circuit configuration of the device according to the present invention. In FIG. 6, reference numeral 1 designates a calculating circuit that contains a frame memory 2 where frame A of FIG. 4 is stored, and which calculates the value of a picture element $X_{i-av_x, j-av_y}^{(1)}$, 3 designates a calculating circuit that contains a frame memory 4 where frame B of FIG. 4 is stored, and which calculates the value of a picture element $X_{i+bv_x, j+bv_y}^{(2)}$, 5 designates a frame memory where interpolated frame I of FIG. 4 is stored, each of 6 and 9 designates an adder, and each of 7 and 8 designates a multiplicator. Calculating circuit 1 and calculating circuit 3 will be explained in detail later. An input terminal denoted by "Video in" is for a picture signal, two input terminals denoted by "i" and "j" respectively are for the coodinates (i, j) of a picture element to be interpolated, an input terminal denoted by "a" is for a parameter named that indicates the position of an interpolated frame, two input terminals denoted by "$v_x$" and "$v_y$" respectively are for the move-quantity ($v_x$, $v_y$) of a given picture signal. The part represented by dotted lines of calculating circuit 1 and that of calculating circuit 3 are indicated by FIG. 8 or FIG. 9. As explained earlier with the equation (2), the value of parameter a is uniquely determined by the relative position relationship between two consecutive frames of a given picture signal and an interpolated frame situated between them.

Then, let's explain how the circuitry of FIG. 6 operates.

Two consecutive frames of a picture signal applied at input terminal "Video in" get stored into frame memory 2 and frame memory 4 respectively one after another. Calculating circuit 1 and calculating circuit 3 calculate the value of a picture element $X_{i-av_x, j-av_y}^{(1)}$ and the value of a picture element $X_{i+bv_x, j+bv_y}^{(2)}$, respectively, from their common input information i.e., the coordinates (i, j) of a picture element to be interpolated, the move-quantity of a picture signal, and the value of parameter a. Multiplier 7 multiplies the output of calculating circuit 1 by (1−a), i.e., b, and derives the first term of the right-hand side of the equation (3). Likewise, multiplier 8 multiplies the output of calculating circuit 3 by a and derives the second term of the right-hand side of the equation (3). These signals are added together by the adder 9 whose output represents the value of a picture element $y_{ij}$. The value of $y_{ij}$ thus obtained is stored in the frame memory 5 at an address specified by the coordinated (i, j). Therefore, the interpolated frame I is obtained by reading out frame memory 5 with a proper timing.

Figure 1:
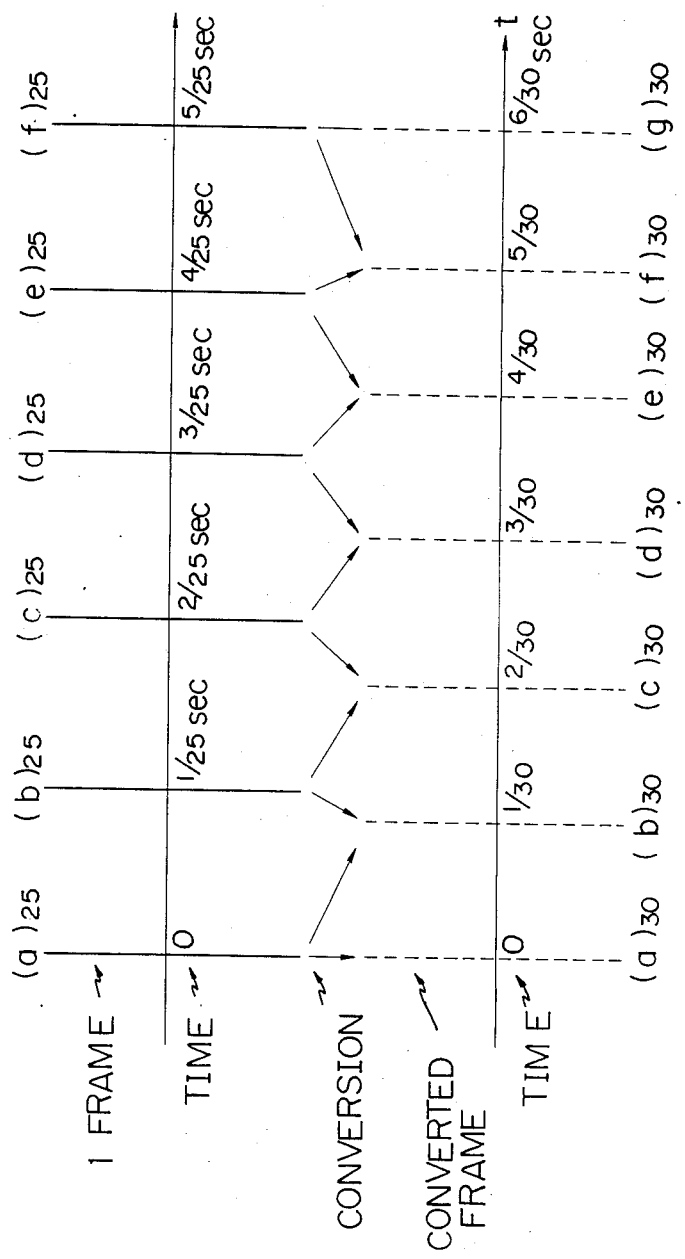
FIG. 1, FIG. 2 and FIG. 3 show some examples of the conventional frame rate conversion systems.
Figure 2:
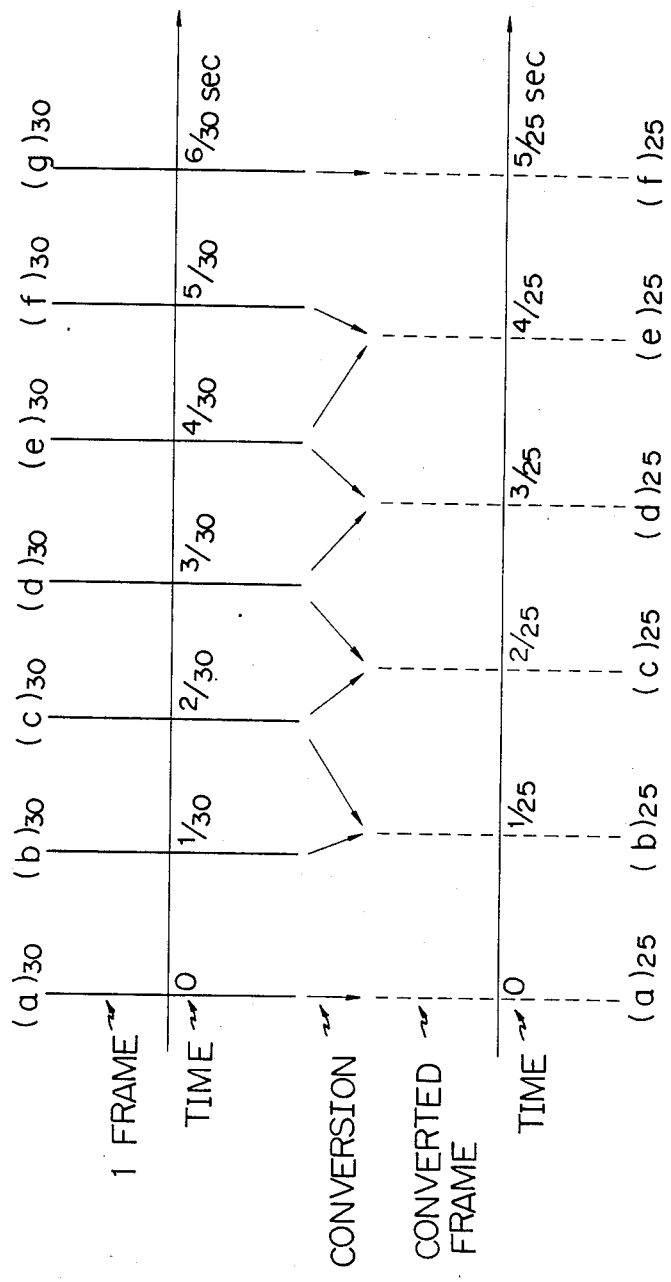
Figure 3:
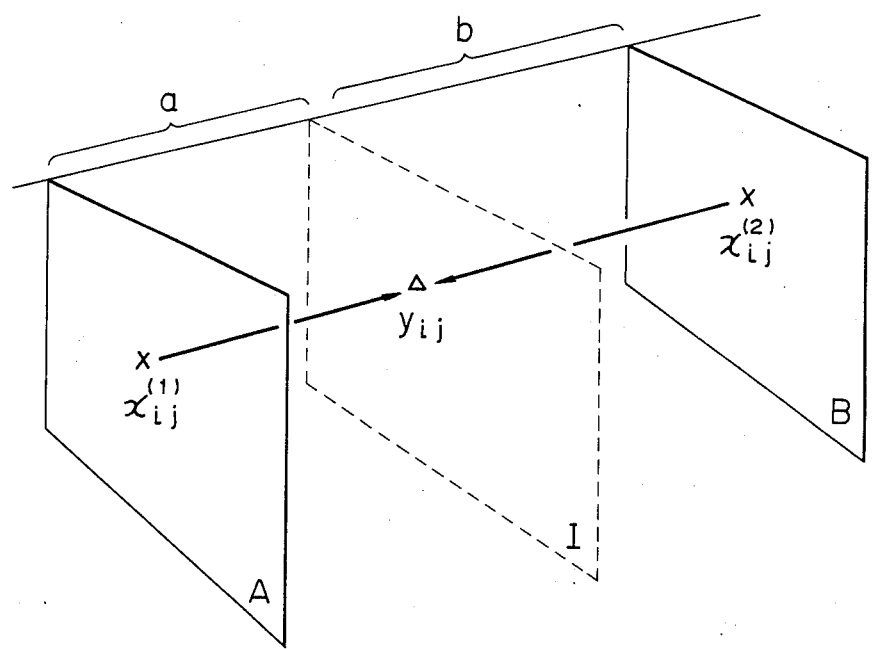
Figure 7:
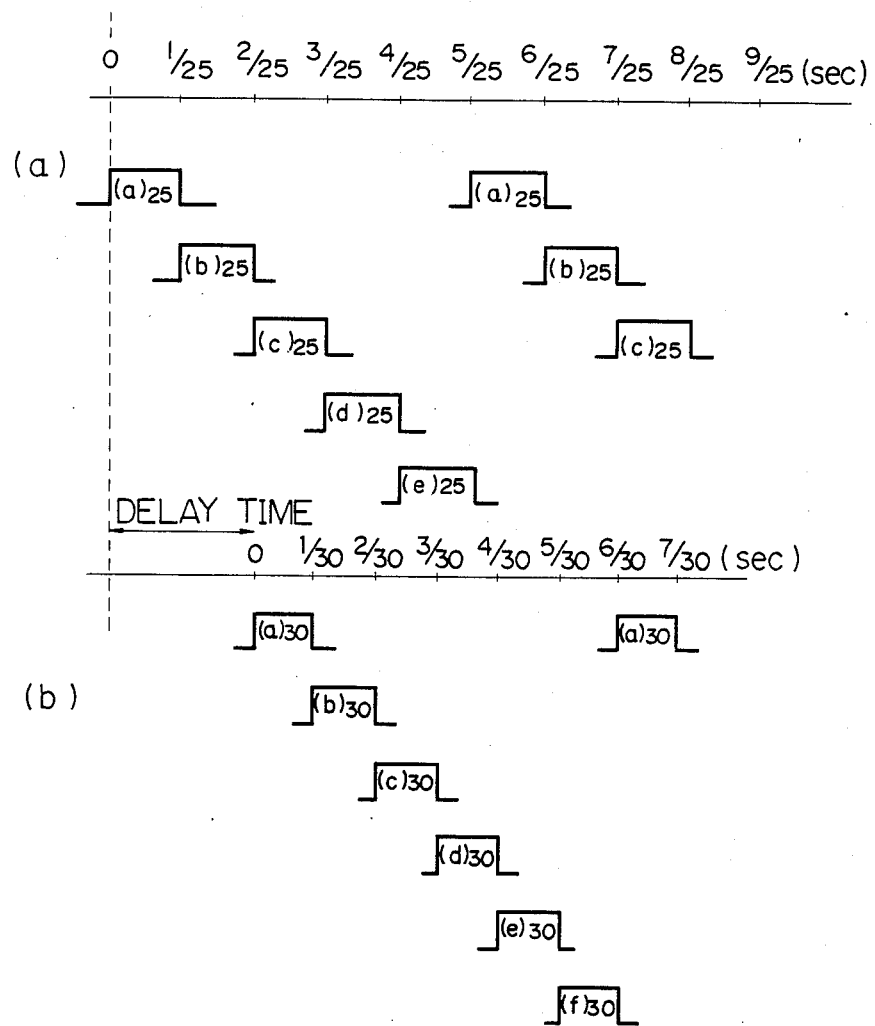
FIG. 7 shows an oprational time chart for use in the frame rate conversion according to the present invention.

It should be noted that in a frame rate conversion, the read-out rate of an input original frame is different from that of a converted output frame. This fact gives rise to a technical problem in the case of FIG. 1 where the converted frame rate is greater than the original frame rate rather than in the case of FIG. 2 where the converted frame rate is smaller than the original frame rate. Consider the frame rate conversion shown in FIG. 1. FIG. 7 shows a relationship in time of the original video signal that gets stored in frame memory 2 and frame memory 4 to the converted video signal that is read out from frame memory 5 with a new read-out rate.

In FIG. 7, (a) shows the read-in timing of an original video signal into frame memory 2 and frame memory 4, and (b) shows the timing for use in reading-in or reading-out of an interpolated signal into or from frame memory 5.

Then let's explain how to construct calculating circuit 1 and calculating circuit 3 that are shown in FIG. 6. Calculating circuit 1 performs the operation required by the equation (4) and calculating circuit 3 performs the operation required by the equation (5) and it is seen easily that the circuit structure of the former is basically the same as that of the latter. Therefore, the following explanation is concerned with the circuit structure of calculating circuit 1.

Figure 5:
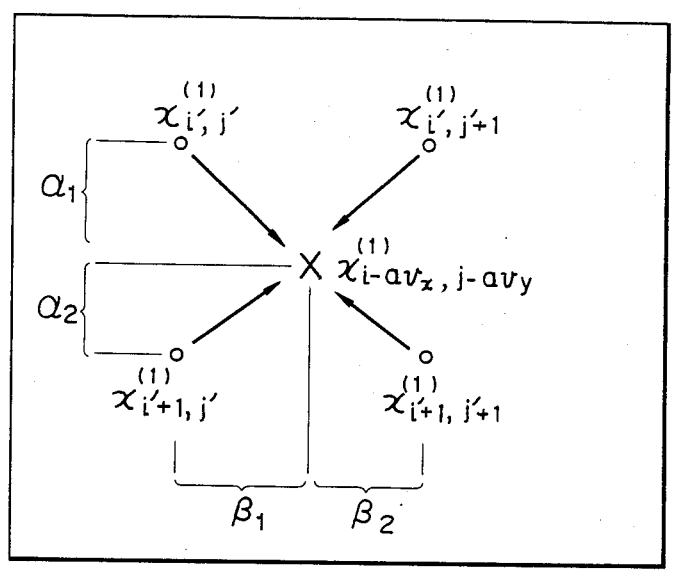
FIG. 5 shows the interpolation of a picture element of a converted frame.

FIG. 8 shows an example of the structure of calculating circuit 1. In FIG. 8, each of reference numerals 10, 15, 20, 21, 22, 23, 26, and 27 designates a multiplier, each of 11, 14, 16, 19, 24, 25 and 28 designates an adder, each of 13 and 18 designates a fraction-part extracting circuit whose output is the fractional part of its input, each of 12 and 17 designates an integer-part extracting circuit whose output is the integer part of its input. As explained earlier with respect to the equation (4) and the equation (5), (see also FIG. 5), the coordinates of four picture elements to be read out from frame memory 2 are $(X_{i',j'})$, $(X_{i',j'+1})$, $(X_{i'+1,j'})$, $(X_{i'+1,j'+1})$ that enclose the coordinates of a picture element calculated for interpolation, i.e., $(i-av_x, j-av_y)$. Frame memory 2 is so designed that it provides the said four picture elements upon receiving the said coordinates of a picture element for interpolation, i.e., $(i-av_x, j-av_y)$. A new coordinate i' is obtained at the output terminal of integer-part extracting circuit 12 by way of multiplier 10 and adder 11. In the same way, j' is obtained at the output of integer-part extracting circuit 17 by way of multiplier 15, and adder 16. The value of $av_x$ is obtained by multiplier 10, whose fractional part is denoted by $\alpha_1$ in FIG. 5. The value of a $v_y$ is obtained by multiplier 15, whose fractional part is denoted by $\beta_1$ in FIG. 5. Therefore, $\alpha_1$ and $\beta_1$ appear at the output terminal of fraction-part extracting circuit 13 and the output terminal of fraction-part extracting circuit 18 respectively. Adder 14 and adder 19 give the value of $\alpha_2$ and the value of $\beta_2$ respectively using the following expressions defined earlier:

$$\alpha_1+\alpha_2=1, \beta_1+\beta_2=1.$$

In this way, with the four picture elements and the values of $\alpha_1$, $\alpha_2$, $\beta_1$, and $\beta_2$ the operation required by the equation (4) is carried out by means of operations 20–28.

The above structure of calculating circuit 1 may give rise to a problem of processing time because it has a lot of operation stages. In order to speed up the processing time, a simple calculating circuit shown in FIG. 9 is effective where instead of performing the interpolation process of the equation (4), one of the four picture elements used in it is chosen for an interpolated picture element. In the circuit of FIG. 9, the coordinates (i,j) of a picture element to be chosen are determined with a minimum approximation error by rounding off $(i-av_x, j-av_y)$.

Figure 10:
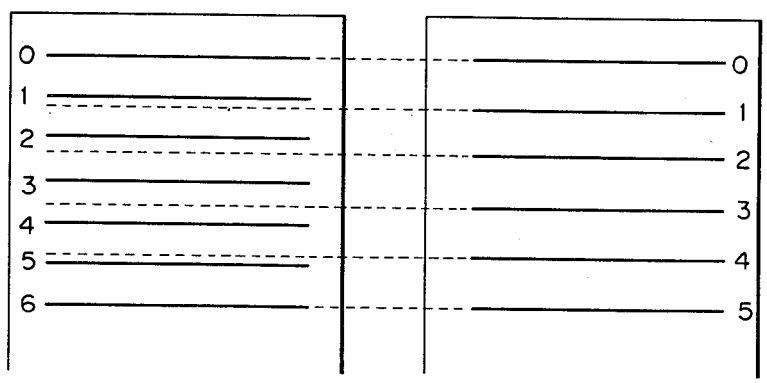
FIG. 10 shows the relative deviation of scanning line position between an interpolated frame and an original frame, when the scanning line number ratio is given by 6/5.

The frame rate conversion principle of the invention is shown above in detail. As stated earlier, at the change of standard frame rate of a TV signal, both the frame rate conversion and the scanning line number conversion are required. When the number of scanning lines per frame of a given picture signal is different from that of a converted picture signal, the position of an picture element of an interpolated frame gets deviated in the longitudinal direction periodically from the position of a picture element to be sampled of an original frame. See an example shown in FIG. 10, where the scanning line number ratio is given by 6/5.

In this case, if the distance between two consecutive scanning lines of an original frame is represented by 1, then the distance between two consecutive scanning lines of an interpolated frame is represented by 1.2, and the equation (4) should be modified as follows:

$$Y_{i,j} = b\, X_{i-av_x,\ 1.2j-av_y}^{(1)} + a\, X_{i+bv_x,\ 1.2j+bv_y}^{(2)} \quad (8)$$

$$X_{i-av_x,\ 1.2j-av_y}^{(1)} = \alpha_2[\beta_2 X_{i',j'} + \delta_1 X_{i',j'+1}] + \alpha_1[\beta_2 X_{i'+1,j'} + \beta_1 X_{i'+1,j'+1}]$$

where
$i' = [i - av_x]$ ([ ] is the symbol of Gauss)
$j' = [1.2j - av_y]$ ([ ] is the symbol of Gauss)
$\alpha_1 = |av_x - [av_x]| < 1$
$\alpha_2 = 1 - \alpha_1$
$\beta_1 = |1.2j - av_y - [1.2j - av_y]| < 1$
$\beta_2 = 1 - \beta_1$ In the same way, $X_{i+bv_x,\ 1.2j+bv_y}^{(2)}$ is expressed by a similar equation. The move-quantity $(v_x, v_y)$ used in the above equation is that of the picture element to be interpolated as in the previous case.

The circuits shown in FIG. 8 and FIG. 9 are applicable in the above case with a minimum modification required by replacement of j with 1.2j.

In general, if a given scanning line number ratio is k/j instead of 6/5 shown in the example, the equation (8) holds with replacement of 1.2 with k/j.

As stated above, the invention makes it possible to have a converted picture signal of high quality when little picture blur and jerkiness even with an original picture signal is in quick motion, by means of detecting the move-quantity of the original signal and using it in the frame interpolation process.

From the foregoing, it will now be apparent that a new and improved frame rate conversion system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A video frame rate conversion method for converting a first video signal having a first frame rate into a second video signal having a second frame rate differeing from said first frame rate, comprising:
   storing a first frame of said first video signal;
   storing a second frame of said first video signal next succeeding first frame;
   selecting a first picture block cell from said first frame of said first video signal, and a second picture block cell from said second frame of said first video signal, said second picture block cell corresponding to said first picture block cell and being moved in position relative said first picture block cell, by selecting video signals corresponding to said first picture block cell and said second picture block cell respectively from four adjacent lattice point cells enclosing each of said first and second picture block cells and calculating said first and second picture block cells respectively from said four adjacent lattice point cells enclosing each of said respective first and second picture block cells;
   generating an interpolated frame temporally between said first and second frame of said first video signal, by performing an interpolation operation between said first picture block cell and said second picture block cell;
   storing said interpolated frame in a frame memory; and
   outputting said interpolated frame from said frame memory at said second frame rate as said second video signal.

2. A video frame rate conversion system for converting a first video signal having a first frame rate into a second video signal having a second frame rate differing from said first frame rate, comprising:
   a first frame memory having a first calculating circuit for providing a first signal $X_{i-av_x,\ j-av_y}$ for a first frame of said first video signal,
   a second frame memory having a second calculating circuit for providing a second signal $X_{i+bv_x, j+bv_x}$ for a second frame of said first video signal next succeeding said first frame;
   means for generating an interpolated frame temporally between said first frame and said second frame and providing an interpolation frame signal $Y_{i,j}$ according to said first signal and said second signal;
   a third frame memory for storing said interpolated frame; and
   means for outputting said interpolated frame from said third frame memory at said second frame rate for providing said second video signal at a frame rate converted from that of said first video signal;
   where i and j are values of a video frame scanning line number and a picture cell number respectively indicating two-dimensional coordinates, a and b are determined according to the length of time between said first and said interpolated frame and the length of time between said second frame and said interpolated frame and satisfy the relation $a + b = 1$, and $v_x$ amd $v_y$ values representing the move quantity of a picture block cel per frame of said first video signal on the x and y coordinates respectively.

* * * * *